United States Patent [19]

Higbee et al.

[11] 3,945,586
[45] Mar. 23, 1976

[54] INTERPOSER RETRACTOR CONSTRUCTION

[75] Inventors: Wallace C. Higbee; Jay W. Jensen, both of Romeo; Ronald J. Walker, Sterling Heights, all of Mich.

[73] Assignee: The Firestone Tire & Rubber Company, Akron, Ohio

[22] Filed: Feb. 4, 1974

[21] Appl. No.: 439,114

[52] U.S. Cl. .......................................... 242/107.4 D
[51] Int. Cl.² ................ A62B 35/00; B65H 75/48
[58] Field of Search ................. 242/107.4; 297/388; 280/150 SB

[56] References Cited

UNITED STATES PATENTS

| | | | |
|---|---|---|---|
| 3,412,952 | 11/1968 | Wohlert et al. | 242/107.4 |
| 3,446,454 | 5/1969 | Kovacs et al. | 242/107.4 |
| 3,598,336 | 8/1971 | Frost | 242/107.4 |

Primary Examiner—Stanley N. Gilreath
Assistant Examiner—John M. Jillions
Attorney, Agent, or Firm—Miller, Morriss, Pappas & McLeod

[57] ABSTRACT

A locker retractor for seat belt harness and the like which includes an interposer element articulated by movement of the drum or reel to selectively block or release a spring biased pawl bar and holding the pawl bar away from locking a ratchet on one or both of the reel flanges or selectively freeing the pawl bar so that it may lock the ratchet in prevention of further drum rotation in the withdrawal direction. The shift from blocking to non-blocking position is achieved by a slight retraction of the webbing after initial free withdrawal, whereupon the interposer element falls free of its blocking relation. The interposer is a latch-like element pivotally and slidably connected to the frame and oriented and frictionally directed by a ring element turned by the moving of the drum. The interposer described is also useful in providing quiet free-pull and retraction in inertial retractors as described in copending application Ser. No. 258,576 filed on June 1, 1972 now U.S. Pat. No. 3,865,320.

4 Claims, 9 Drawing Figures

INTERPOSER RETRACTOR CONSTRUCTION

The present invention comprises a retractor in which the means for activation of the pawl in prevention of further withdrawal of safety harness webbing, cable, or the like, is an interposer or frictionally guided latch which engages or disengages the pawl element in accord with the desired function of the retractor. On slight retraction or rewinding of the webbing, the interposer is caused to fall free of its blocking position of the pawl and any further withdrawal of webbing is prevented because the pawl is biased toward contact with the ratchet and can thus engage the ratchet. A free-pull cam acting intially on the interposer assures initial relief from lock-up despite retraction for a selected number of revolutions of the retractor drum. Thereafter the slight retraction arms the structure to lock the ratchet and hence the reel or drum against any further withdrawal movement. The cam or spine also serves to eliminate ratchet to pawl chatter through a selected distance of retraction. In the application of the interposer of inertial retractors, the pawl is similarly blocked by the interposer from access to the ratchet teeth thus avoiding lock-up during initial free-pull falling free of the pawl blocking position on slight retraction. In such instances the pawl is not usually spring loaded toward the ratchet on the storage drum.

BACKGROUND OF THE ART

Automatic locking retractors are relatively well known in the art and the U.S. Pat. No. 3,174,704 to Replogle; U.S. Pat. No. 3,412,952 to Wohlert; and U.S. Pat. No. 3,667,698 to Fisher are characteristic of such devices in commercial usage. All involve a reel or drum which is a receptacle for safety webbing or harness. The drum is biased to rewind the harness by a retractor spring motor which winds the webbing on the drum. The drum includes ratchet means movable with the drum and providing a one-way lock against withdrawal of webbing when a pawl is engaged therewith. The pawl is pivotal on the frame which supports the drum and is spring biased toward closure against the teeth of the ratchet. In Replogle the pawl is pivotal on a shaft which includes a webbing feeler and a cripple link, the latter selectively engageable or disengageable from the drum shaft on recock depending upon the slight retraction of the webbing after withdrawal beyond the contact of the webbing feeler with the webbing. Retraction was noisy until the retracting motion built up sufficient webbing on the drum to lift the pawl away from engagement with the ratchet. In Wohlert and in Fisher a face clutch structure selectively moves a blocking cam plate to free a spring biased pawl so that engagement with the ratchet is possible. The blocking cam plate during initial withdrawal of webbing prevents lock-up, but on a slight retraction of the webbing, and corresponding motion of the cam plate, the blocking cam plate is released from its blocking of the pawl and on any further withdrawal, the pawl engages the ratchet. In Wohlert, the initial free-pull is dependent upon a webbing feeler or sensor which holds the pawl away from ratchet engagement and allows the cam plate to achieve its blocking position until otherwise influenced by retraction after withdrawal beyond the sensor contact limit. In Fisher the sensing for free-pull is determined by a gear driven element which is essentially a rotation counter and depending on the desired number of rotations, it holds the pawl out of all possible locking action until the desired withdrawal has occurred. Concurrently, a face clutch operated blocking cam plate is moved into blocking relation to be released on slight retraction. Then the cam is freed from its blocking relation and further withdrawal is prevented because the pawl can and does contact the ratchet and prevent the drum from withdrawal. On further retraction, after the slight retraction, the cam blocking plate locates in a secondary blocking of the pawl preventing noise by preventing contact of pawl to ratchet during rewind.

As will be seen, the present invention contemplates the use of an interposer acted upon by selected drum motion to provide an interference with a spring biased pawl thereby avoiding the need or desire for a cripple link construction and avoiding the necessity of a face clutch construction driving from the drum. The present invention is amenable to a rotation counting system but greatly simplifies the linkages required and at substantial reduction of weight and parts.

Accordingly, the principal object is to provide a new structure for actuating the pawl lock in automatic locking retractors.

Another object is to provide a new and inventive means for blocking the pawl of a safety belt retractor which is acted upon by a ring and most particularly the outer surface of the ring and where the ring is moved in selected (as by geared) proportion to the movement of the retractor drum.

Another object is to provide an interposer blocker to assure initial quiet free-pull and quiet retraction in the inertial retractor of the copending application Ser. No. 258,576 filed on June 1, 1972 now U.S. Pat. No. 3,865,320.

Other objects including quiet actuation on retraction and withdrawal together with a reel amenable to easy electrical interlock integration and with savings in parts and complexity will be increasingly appreciated as the description proceeds.

GENERAL DESCRIPTION

In general, a spring motor retractor for safety harness or webbing is provided which construction parallels, for example, the spring motor retractor shown in U.S. Pat. No. 3,667,698 where a reel or drum receptacle is mounted for rotation in a frame and where the shaft of the drum is connected to a spring loaded retractor motor and the drum includes ratchet end flanges. In the frame a pawl bar is pivotally mounted and the integral pawl teeth are movable into and out of contact with the ratchet on the drum flanges so that withdrawal of webbing from the drum is prevented when the pawl engages the ratchet. In the present construction one end of the pawl bar is bifurcated to provide a pair of laterally extending stubs, the uppermost of which extension forms a latch element restrained by the blocking end of an interposer element and the interposer element is pivotal and slightly extendable and includes a hook-like end which selectively grips or restrains the uppermost stub of the pawl bar in prevention of the latch bar or pawl from tilting into contact with the ratchets on the drum or reel. Accordingly, the latch bar or pawl is mounted in the frame and is spring biased toward contact with the ratchets. The interposer is pivoted from the frame or the latch bar. When it is pivoted from the frame, it rests on a pin or pivot and the pin is in the frame and extends into the slotted opening transversely through the interposer. The hook end of the interposer is split longitudinally and is split-legged to straddle a guide cam spine element which extends peripherally from a ring or disc. The perimeter face of the guide cam element, other than the cam portion, is serrated or coined and frictionally engages the outermost hook end of the interposer causing the interposer to climb the serrations in a withdrawal direction of drum rotation and to fall free of the serrations or coining when a slight retraction motion occurs.

The ring or disc is rotated proportionately by the movement of the drum and the amount of movement is easily selected by the gearing employed to positively drive the disc or ring. For example, a spur gear may directly drive the ring or a spur gear keyed to the shaft of the drum may turn a planet gear which in turn moves the ring via engagement with a ring gear. As will be seen, it is important that the direction of movement of the ring gear causes frictional engagement of the interposer so that the interposer rises with the motion of the ring or disc. In this manner, the rotation of the ring and its cam or spine can be selected as desired, the cam portion entering the split portion of the interposer and itself blocking the pawl or latch bar during initial withdrawal and thereafter the interposer climbs the ring as frictionally urged by the serrations thereby holding the pawl by its upper stub from locking. Then, on retraction of a slight amount, the interposer falls away from the climbing and blocking posture and on any further withdrawal the spring loaded pawl locks the ratchet and stops withdrawal rotation of the drum. On retraction, the entry of the cam portion into the split portion of the interposer assures quiet performance during the completion of retraction and reorients the interposer for the next sequence from free-pull to slight retraction. So long as the cam portion of the ring restrains the interposer and blocks the pawl, the webbing or harness can be manipulated in or out at will without changing the condition of the interposer to lock against withdrawal. The friction between ring and interposer occurs with further withdrawal of harness and causing the interposer to climb the ring. Such lock-out of the pawl only occurs after the distance of the ram-ended cam sector on the ring has been exceeded.

While the preferred embodiment contemplates the pivoting of the interposer from the frame, it is also possible to pivot the interposer on the lower leg or stub of the latch bar or pawl element.

Functionally, an economical automatic locker has been provided and the interposer is never subjected to any severe shock or strain and a very positive control is established over the free-pull aspect of the operation of such retractors. The face clutch problems are eliminated and the structure performs reliably at reduced weight and with improved simplicity.

This interposer structure is useful in all types of harness retractors wherein a spring bias urges a latch bar or pawl toward the ratchet and in particular it has been applied in inertial retractors where an initial free-pull is desired and in avoidance of premature lock-up because of chance acceleration on initial withdrawal or free-pull.

IN THE DRAWINGS

SPECIFIC DESCRIPTION

Figure 1:
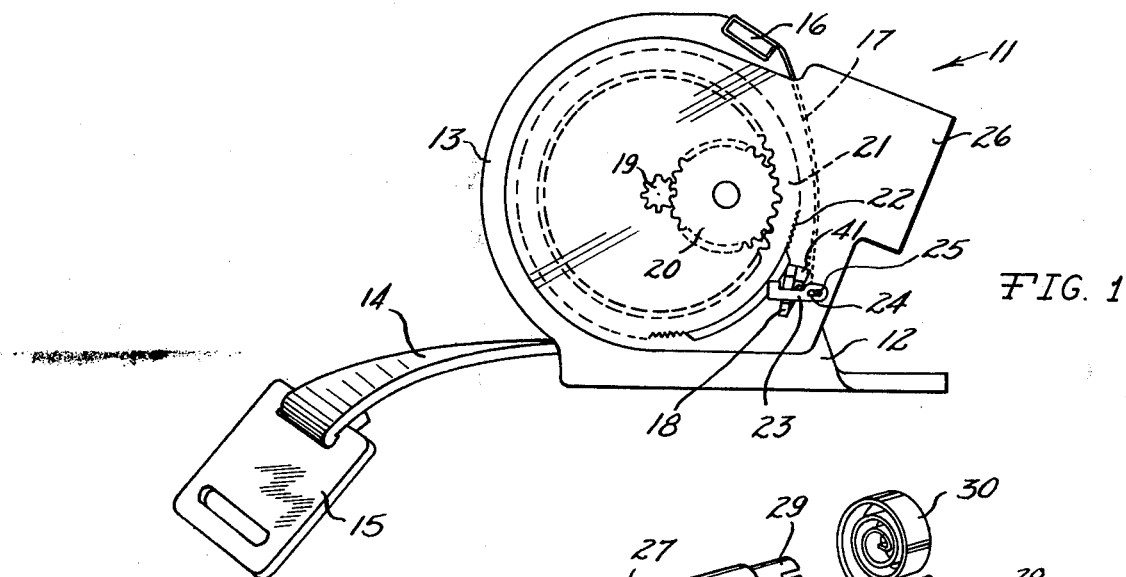
FIG. 1 is a side elevation view of a safety belt retractor in accord with the present invention and indicating the interposer of the present invention acting between a driven ring or disc and a pawl element. This postures the interposer to prevent pawl movement.

Referring to the drawings and more specifically to the FIG. 1 thereof, a retractor 11 is shown comprising a frame 12 having a pair of spaced apart walls 13 which, as will be seen, provide journal support for a shaft of reel or drum onto which is wound webbing 14 with terminal connecting hardware element 15 usually at the terminal end thereof. The terminal hardware element 15 such as the latch plate as shown for a buckle is typical of a safety harness arrangement as used in automobiles, aircraft, and other vehicles to restrain the drivers or passengers. A spacer strut 16 is shown spanning between the walls 13 and in support of a spring element 17 which, as will be seen, applies a constant bias against the pawl bar 18 urging the pawl bar 18 toward engagement with a ratchet which turns with the drum or reel and is preferably formed in teeth on the flanges of the drum or reel. The shaft of the drum or reel is connected to a splined gear 19 and the gear rotates with the drum or reel during withdrawal of webbing 14 therefrom and during rewinding retraction of the webbing 14. As shown, the gear 19 is operably connected to another gear element 20 and the gear element 20 rotates the internally toothed ring 21. The outer perimeter face of the ring 21 is upset at 22 to provide an increased frictional engagement with the end of the interposer 23. The interposer 23 is pivotal on the pin 25 and the slot 24 in the interposer 23 allows the interposer 23 to be radially extended in accord with selected movement of the interposer 23. The housing 26 extending from the wall 13 of the frame 12 is to adapt the frame for connection to selected electrical or electronic hardware as relays or switches to accommodate specific electrical interlock as desired.

Figure 2:
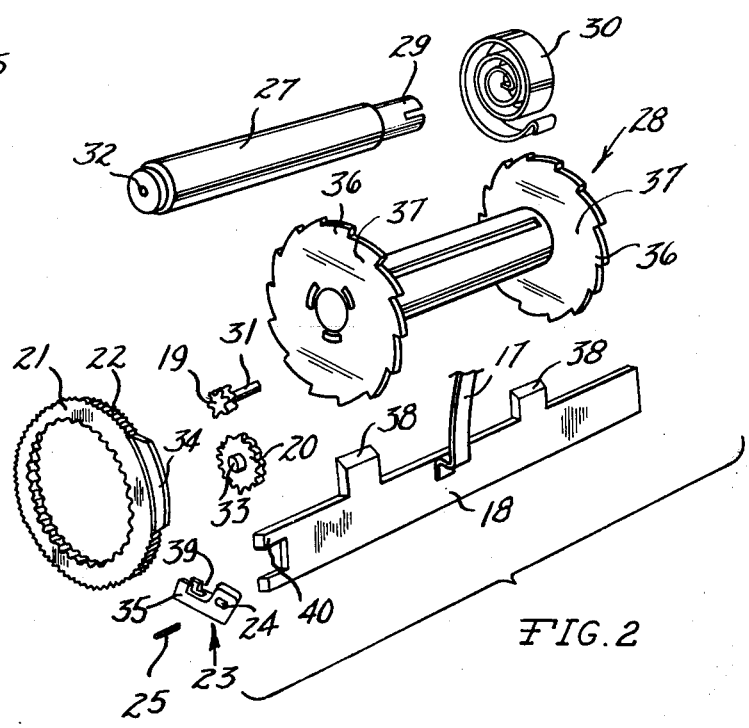
FIG. 2 is an exploded perspective view of the principal elements in the structure of FIG. 1 and indicating the position and structure of the interposer in cooperation with the ring-cam or spine element and the latch bar or pawl.

In FIG. 2 the structure broadly expressed in FIG. 1 is in an assembly relationship of elements as operative in respect to the frame 12.

The shaft 27 which supports the reel or drum 28 is shown as bifurcated on one end 29 so that it can be operatively connected to the inner end of the retractor motor spring 30. As will be appreciated, the motor spring 30 is connected at its center to the shaft 27 and is connencted at its outer periphery to the frame 12 or to an extension thereof. The spring 30 is wound up during withdrawal of webbing 14 from the reel or drum 28 (in a clockwise direction or rotation as shown) and this applies a rewind bias to the webbing 14 and reel 28 urging the return of the webbing 14 onto the drum or reel 28 (rewind is counterclockwise as shown). The pinion gear 19 fixed to the splined stub shaft 31 extends axially into the shaft 27 at the splined opening 32. This assures that the pinion gear 19 will move in accord with shaft or drum movement since the shaft 27 is secured to the drum 28. The gear element 20 is operably engaged with the pinion and is pivotal on its stub shaft 33 which is fixed to the frame 12 in a suitable journalling recess or opening (not shown). The ring element 21 with its perimetric upsets 22 (such as coining) is secured for rotation in respect to the frame 12 in accord with movement of the gear 20 and in response to the movement of the pinion gear 19 turning with the shaft 27. A ramp segment or spine extension 34 is integral with the ring gear 21 and extends for a spaced distance as a segment extension of the periphery of the ring 21. It will be appreciated that the gearing arrangement for the ring 21 assures that the ring 21 will move in an opposite direction to movement of the drum 28. In all instances during withdrawal of webbing 14 from the drum 28 the ring 21 should frictionally urge the interposer 23 upward. The interposer 23 is bifurcated and the limbs 35 extend to straddle the spine 34 in a guide relationship. The slot 24 in the interposer 23 is mounted on pin 25 so that the interposer 23 is pivotal on the pin 25 and radially extendable in respect to the pin 25 to the extent permitted by the slot 24. Accordingly, the interposer 23 may depend from the pin 25 and under selected frictional engagement may extend itself in respect to the pin 25 in climbing engagement with the ring 21 in one direction as webbing 14 is withdrawn. This function will be better appreciated as the description proceeds. The interposer 23 is thus freely pivotal on the pin 25 and movable to the extent of the slot 24 located at one end of the interposer 23. The other end of interposer 23 is bifurcated and the bifurcations or limbs 35 frictionally engage the ring perimeter under selected conditions to climb upward to pawl blocking position and then on reversal of the rotation of the ring 21 the interposer 23 falls free of the ring 21 allowing the pawl bar 18 to reach the ratchet teeth 36 in the flanges 37 of the drum 28. This restraint and release of the pawl bar 18 carrying the pawl faces 38 is because the bifurcated end of the interposer 23 includes a hook portion 39 which, on climbing the ring 21, will be seen to latch the pawl bar 18 at the pawl bar extension 40 thereby preventing rotation of the pawl bar 18 under the influence of the spring 17 which spring 17 provides a constant bias toward closure of the bar 18 against the ratchet teeth 36. The pivoting of the pawl bar 18 is in the wedge shaped openings 41 provided in the sides 13 of the frame 12. The opening 41 is best appreciated by reference to FIG. 1. From the FIG. 2 it will be appreciated that the pawl bar 18 is prevented from closing on the ratchet teeth 36 by blocking engagement of the spine 34 through a selected amount of travel. The spine 34 has frictionally urged the interposer 23 (acting on the flanks or cheeks of the split legs 35) to climbing or following frictional engagement with the surface 22 of the ring 21 and this latches the pawl bar 18 at the extension 40 as further withdrawal of harness 14 proceeds. The latch action also blocks overrun of the interposer 23 by engagement with the pawl bar extension 40. Then, on slight retraction of the webbing 14, the interposer 23 reverses its direction of movement (the hook end depending to rest engagement against the stop 42 on the bar 18). This releases the pawl bar extension 40 and the pawl bar 18 can now effectively pivot to engage the teeth 36 on the flanges 37 of the drum 28. This, then stops any further withdrawal of webbing 14 from the drum. Retraction can proceed at any time because the pawl faces 38 are initially cleared by the backs of the teech 36 pushing the pawl bar 18 outward against the spring 17 as the retractor spring 30 urges rewind. All lock up stresses are absorbed by the ratchet - pawl engagement and the stresses are carried by the pawl 18 and shaft 27 into the frame 12 and thence into the supporting vehicle (not shown) to which the retractor 11 is secured.

Figure 3:
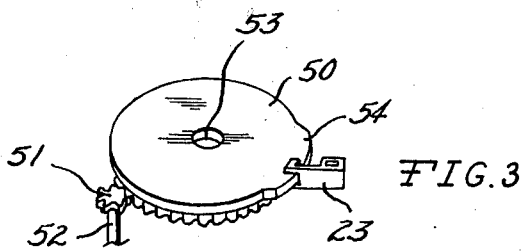
FIG. 3 is a geared variation of the ring to disc form and acting on an interposer.

In FIG. 3 a slightly modified version of the structure shown in FIGS. 1 and 2 is shown in which the ring 21 is replaced by a gear driven disc 50, driven by a pinion or gear 51 which is directly or indirectly driven by the shaft 52 in accord with the movement of a drum 28. The disc 50 rotates on a shaft or pin through the opening 53 and the disc 50 includes a spine extension segment 54 which otherwise performs in accord with the description of the spine 34 in causing the interposer 23 to be frictionally oriented to block the pawl 18 and in addition the spine segment 54 operates to disengage the pawl 18 from the ratchet teeth 36 during initial withdrawal.

Figure 4:
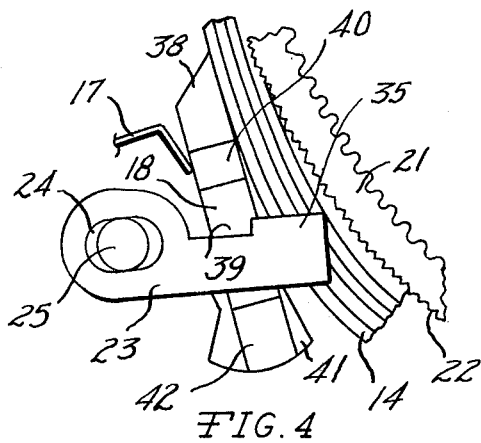
FIG. 4 is an interposer in accord with the present invention in floating position and useful where the webbing ultimately restrains the pawl or latch bar element from engaging the ratchet for initial free-pull and where frictional engagement of the interposer with the serrated disc or ring causes blocking of the pawl on withdrawal and then releases the pawl on slight retraction.
Figure 5:
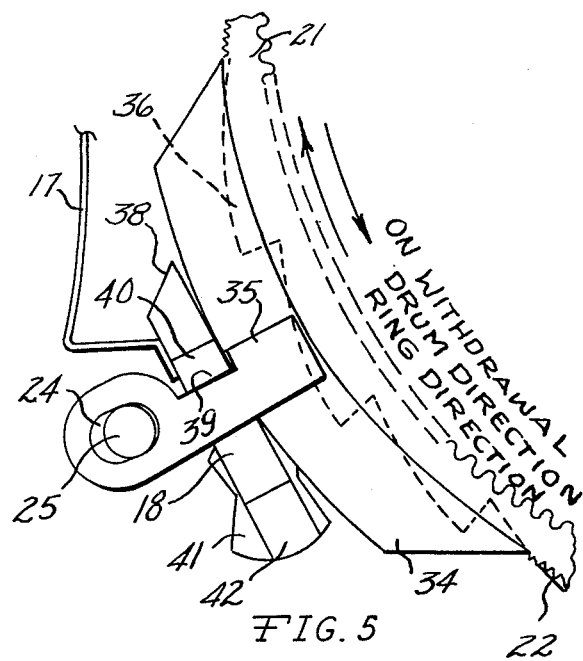
FIG. 5 is an increased scale somewhat stylized fragmental side elevation view of the interposer of FIG. 1 where the cam portion of the disc is straddled by the interposer and cam and interposer restrains the pawl or latch bar.
Figure 6:
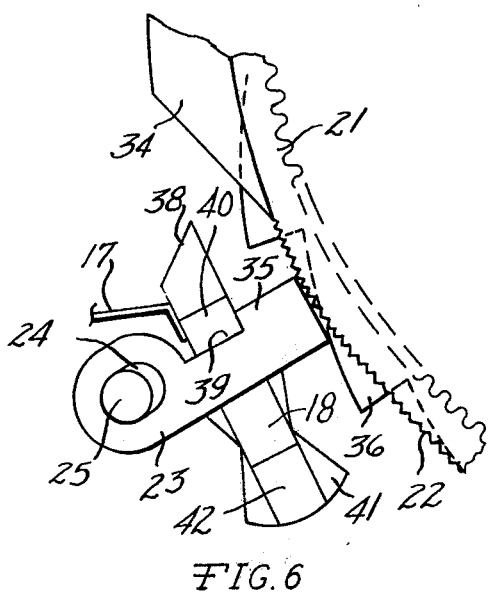
FIG. 6 is a side elevation fragmental view of the structure in claim 5 and showing the cam rotated out of engagement against the pawl but with the serrated face of the ring frictionally carrying the interposer in the pawl blocking position during withdrawal.
Figure 7:
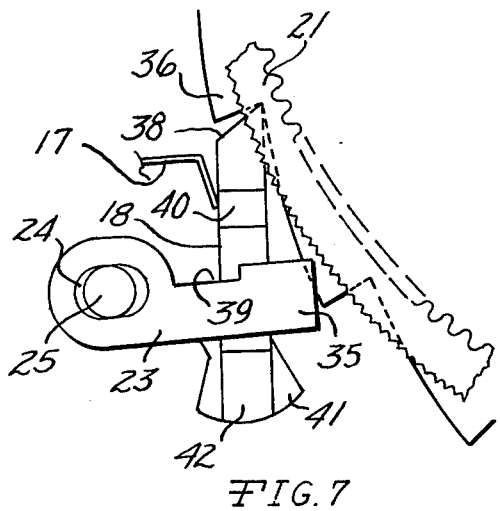
FIG. 7 is a side elevation fragmental view of the structure in FIGS. 5 and 6 and showing that on slight retraction the ring element reverses its friction causing the interposer element to be floating on its pivot and dropping force of its blocking relation in respect to the pawl thereby causing the pawl to obey the spring bias toward the engagement of the ratchet teeth.

FIGS. 4, 5, 6, 7, and 8 illustrate best the operation of the interposer 23 at various moments of usage in the retractors 11. FIG. 4 shows the webbing 14 filling a drum 28 and in which the bulk of the webbing or harness 14 urges the pawl bar 18 out of contact with the ratchet teeth 36 in the flanges 37 of the drum 28. As withdrawal of the webbing 14 occurs the drum 28 and teeth 36 rotate in a counterclockwise direction as seen in FIG. 5 and the ring 21 via its gearing moves in a clockwise direction as shown. The ramp ended spine segment or cam 34 follows the ring direction of movement, enters between the bifurcated limbs 35 of the interposer 23 and orients the interposer 23 frictionally as shown in FIG. 5 to hooked grip relation on the pawl bar extension 40 and holding the pawl bar 18 out of contact with the teeth 36 in the ratchet flanges 37 of drum 28. This continues after passage of the spine segment 34 since the bifurcated ends 35 of the interposer 23 frictionally engage the coining or upsets 22 in the ring 21. Thus the motion of the ring 21 causes the interposer 23 to climb the ring 21 and continues the latch relationship restraining the pawl bar 18 from following the bias of the spring 17. In FIG. 6 this relationship is clear as withdrawal of webbing 14 continues. In FIG. 7 withdrawal of webbing 14 has been completed and a passenger or driver in a vehicle has coupled the buckle to the belting and a retraction movement occurs as belt slack is picked up by the rewind bias of the spring motor 30. This action reverses the direction of drum rotation and ring rotation. As the ring 21 rotates in obedience to its gearing to the drum 28 in a counterclockwise direction during retraction, the teeth 36 rotate clockwise. As the ring 21 reverses direction, pawl bar 18 is freed because the interposer 23 is rotated out of its grip relation on the extension 40 and the interposer 23 falls free of latching. Thereupon any further withdrawal of webbing 14 is opposed because the pawl engaging surfaces 38 are tilted by the spring 17 into continuing contact with the ratchet teeth 36. Retraction can always occur and as retraction fills the drum 28 with harness 14, first the ramped spine segment 34 acting as a cam blocks access to the teeth 36 as it reaches that point in retraction and the condition of FIG. 4 is ultimately restored on full retraction. The operating cycle is then ready for repeat.

Figure 8:
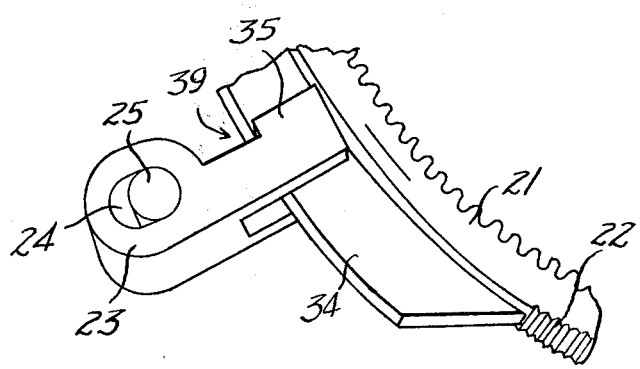
FIG. 8 is a fragmental perspective view showing the cam portion of the ring lifting and repositioning the interposer element as retraction continues and where the cam portion blocks the pawl from reaching the ratchet.

In the FIG. 8 the fragmental perspective best indicates the straddle relationship of the interposer limbs 35 on either side of the spine segment 34 to accomplish orienting positioning of the interposer 23 prior to frictional engagement with the coining 22. The ramped character of the ends of the spine segment 34 of the ring 21 are best shown and frictional mechanism is best illustrated for positioning the interposer during initial withdrawal.

Figure 9:
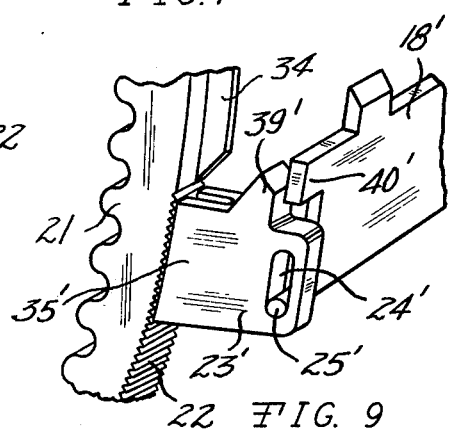
FIG. 9 is a perspective view showing a modified version of the interposer adapted to pivot from the end of the pawl or latch bar element and to selectively frictionally engage the driven ring element for blocking the pawl on withdrawal.

The FIG. 9 shows a slightly modified version of an interposer 23' in accord with the present invention and used with a ring 21 and spine 34. The interposer 23' is slotted at one end and the slot 24' rides over or on a pin extension 25' which is integral with the latch or pawl bar 18'. Then the hook extension 39' on the upper surface of the interposer 23 climbs upward (allowed by the slot) to block the rotation of the pawl bar 18' by blocking engagement with the extension 40' of the bar 18'. On reversal of the direction of the ring 21 (clockwise as shown) the interposer drops vertically downward and frees the pawl bar 18' for locking with the ratchet surfaces. The bifurcated limbs 35' still flank the spine segment 34 for orientation. In this modification no pin 25 is required to be separately provided in frame 12 of retractor 11.

In operation, the structures described have worked smoothly and well during repetitive testing and the system is utilizable in locking retractors and in inertial retractors where it is desired to provide selected initial free-pull to disengage the pawl from inertial influence until the structure is latched. As will be appreciated, no major stresses are transmitted to the interposer-ring structure and these elements can be made from resin materials and the like in mass produced form as by injection molding at relatively low costs and without materially increasing the weight of the structure. The use of resin gears and interposer components can reduce weight. Generally greater compactness results unless collateral apparatus such as interlock hardware is required to be integrated.

Having thus described our invention and several operative embodiments thereof, those skilled in the art will perceive improvements, modifications and changes therein and such improvements, modifications and changes are intended to be included herein limited only by the scope of the hereinafter appended claims.

We claim:

1. In a safety belt harness retractor having a spring motor retractably driving a harness storage drum mounted in a frame, and said drum having ratchet teeth on the flanges of said drum and harness wound on said drum for withdrawal and retraction, the combination comprising:

a freely pivotal interposer element having an elongated pivot slot in one end and a split portion and a friction engaging surface at the other end and a channel shaped blocking surface intermediate the ends thereof;

a ring, means drivably connecting said ring to said drum, said ring having a friction outer perimeter surface and a cam spine extending peripherally therefrom through a selected arc and said cam spine portion engaging said interposer in said split portion and said friction outer perimeter surface of said ring engageable with said friction engaging surface of said interposer;

a pin connected to said frame extending through said elongated pivot slot in said interposer and said interposer pivotal on said pin and said interposer radially movable in respect to said pin to the extent of said slot in said interposer; and a spring biased pawl element biased toward closure against the ratchet teeth of said drum having a portion overlapping the cam spine and blocked from contact with said ratchet teeth by said interposer after an initial free-pull of said harness, said pawl initially blocked by said cam spine and thereafter by said channel shaped blocking surface of said interposer, said interposer urged to blocking position by engagement of said cam spine with said split portion as harness is withdrawn from said drum, and on retraction of harness said ring reversing its motion and releasing said interposer by engagement of said friction surfaces, thereby permitting said pawl to engage with said ratchet teeth.

2. A pawl blocking combination for seat belt retractors having a spring loaded pawl urged toward closure against a drum driven ratchet comprising:

a drive means connected to said drum for movement therewith;

a friction ring having an outer friction surface drivably connected with said drive means and said ring having a cam spine in radial alignment with a portion of said pawl, said spine radially extending from said ring through an arc of said ring; and a split legged interposer element, means securing said element to said retractor for pivotal and radial movement, said element having a friction surface engagable with said friction surface of said ring and being radially shiftable on said retractor in accord with the direction of travel of said ring, said interposer including a blocking interposable between said pawl and said ratchet and a frictional engagement with said spine when said spine is positioned between said split legs, said spine when positioned between said split legs of said interposer providing initial blockage of said spring loaded pawl and thereafter frictionally drawing said interposer into blocking relation with said pawl by friction contact with said split legs, said interposer thereupon holding said pawl out of contact with said ratchet until rotation of said drive means is reversed whereupon said blocking surface falls away due to engagement of said friction surfaces and said blockage of the pawl is released.

3. A pawl blocking combination for seat belt retractors of the type having spring loaded pawls urged toward locking against a drum driven ratchet comprising:
- a drive means driven by retraction and withdrawal rotation of said drum;
- a ring connected to said drive means and proportionately driven thereby, said ring including a peripheral friction surface and a cam spine segment extending radially therefrom, said cam segment ramped fore and aft to initially and terminally lift said pawl free of said ratchet;
- a split legged interposer having a pawl blocking surface element, means for pivotally and extendably mounting said interposer on said retractor, said interposer legs being positioned in an interference path with said ring to engage frictionally the periphery of said ring and to straddle and frictionally engage said cam spine of said ring, said interposer pivoting on said retractor and extending by frictional engagement between said cam and legs to frictionally engage said ring and climb said ring during withdrawal rotation of said ring driven by said drive means to a position blocking said pawl by engagement of said pawl with said pawl blocking surface, and thereafter on slight rotation during retraction motion of said retractor, said interposer, by frictional engagement between said interposer and said friction surface of said ring, reversing its pivotal extension motion to release blockage of said pawl.

4. In the combination as set forth in claim 3, wherein a gear train is connected to said ring and to said retractor for rotation thereby to provide proportional rotation of said ring.

* * * * *

UNITED STATES PATENT OFFICE
CERTIFICATE OF CORRECTION

PATENT NO. : 3,945,586
DATED : March 23, 1976
INVENTOR(S) : Wallace C. Higbee, Jay W. Jensen, Ronald J. Walker It is certified that error appears in the above-identified patent and that said Letters Patent are hereby corrected as shown below:

Column 1, line 22, change "of" to read --- to ---

Column 1, line 24, after "free-pull" insert --- but ---

Column 6, line 28, change "teech" to read --- teeth ---

Column 8, line 58, after "blocking" insert --- surface ---

Signed and Sealed this

Sixth Day of July 1976

[SEAL]

Attest:

RUTH C. MASON
*Attesting Officer*

C. MARSHALL DANN
*Commissioner of Patents and Trademarks*